United States Patent
Gaurav Kishore et al.

(10) Patent No.: US 12,031,588 B2
(45) Date of Patent: Jul. 9, 2024

(54) CLUTCH PLATE AND A METHOD FOR DETECTING WEAR OF A CLUTCH PLATE

(71) Applicant: Volvo Truck Corporation, Gothenburg (SE)

(72) Inventors: Sukanya Gaurav Kishore, Bangalore (IN); Dushyanth S, Tiruchirapalli (IN)

(73) Assignee: VOLVO TRUCK CORPORATION, Gothenburg (SE)

( * ) Notice: Subject to any disclaimer, the term of this patent is extended or adjusted under 35 U.S.C. 154(b) by 287 days.

(21) Appl. No.: 17/639,403

(22) PCT Filed: Aug. 31, 2020

(86) PCT No.: PCT/EP2020/074183
§ 371 (c)(1),
(2) Date: Mar. 1, 2022

(87) PCT Pub. No.: WO2021/043702
PCT Pub. Date: Mar. 11, 2021

(65) Prior Publication Data
US 2022/0316854 A1    Oct. 6, 2022

(30) Foreign Application Priority Data

Sep. 2, 2019    (IN) .............................. 201941035302

(51) Int. Cl.
*F16D 13/64*    (2006.01)
(52) U.S. Cl.
CPC .......... *F16D 13/64* (2013.01); *F16D 2300/18* (2013.01); *F16D 2500/5023* (2013.01)
(58) Field of Classification Search
CPC .... F16D 13/46–50; F16D 13/58; F16D 13/64; F16D 66/02–024;
(Continued)

(56) References Cited

U.S. PATENT DOCUMENTS 4,474,274 A * 10/1984 Lutz ........................ F16D 13/58
200/61.4
5,634,541 A    6/1997 Maucher
(Continued)

FOREIGN PATENT DOCUMENTS

CN    103967963 A    8/2014
DE    2114259 A1    10/1972
(Continued)

OTHER PUBLICATIONS

First Office Action for Chinese Patent Application No. 202080061086.2, mailed Nov. 23, 2023, 6 pages.
(Continued)

*Primary Examiner* — Richard M Lorence
(74) *Attorney, Agent, or Firm* — Sage Patent Group (57) ABSTRACT

A clutch plate and a clutch assembly for use in a powertrain of a vehicle, the clutch plate being configured to be connected for common rotation with a driven shaft extending in an axial direction, the clutch plate including a support member and a first friction member attached thereto, the first friction member having a first friction surface configured to face and selectively engage a corresponding second friction surface of a flywheel, the clutch plate further including an electrically conducting element extending from the first friction surface toward the support member in a direction having an axial component, the electrically conducting element being configured to be electrically connected to a terminal, so that, upon engagement of the first and second friction surfaces, an electric signal may be passed between the flywheel and the terminal via the electrically conducting element.

15 Claims, 3 Drawing Sheets

(58) Field of Classification Search
CPC ....... F16D 66/026–027; F16D 2300/18; F16D 2500/5023
See application file for complete search history.

(56) References Cited

U.S. PATENT DOCUMENTS 5,690,203 A     11/1997   Link et al.
6,384,721 B1 *   5/2002   Paielli .................... F16D 66/02
                                                    188/1.11 R

FOREIGN PATENT DOCUMENTS

| | | | |
|---|---|---|---|
| DE | 4445577 C1 | | 2/1996 |
| DE | 102014202078 A1 | | 8/2014 |
| FR | 2496204 A1 | | 6/1982 |
| FR | 2784427 A1 | | 4/2000 |
| GB | 2255145 A | * 10/1992 | ........... F16D 66/024 |
| GB | 2294983 A | | 5/1996 |
| RU | 2128792 C1 | | 4/1999 |

OTHER PUBLICATIONS

International Search Report and Written Opinion of the International Searching Authority, PCT/EP2020/074183, mailed Dec. 8, 2020, 8 pages.
International Preliminary Report on Patentability issued by the International Preliminary Examining Authority dated Sep. 7, 2021, PCT/EP2020/074183, 14 patges.

* cited by examiner

CLUTCH PLATE AND A METHOD FOR DETECTING WEAR OF A CLUTCH PLATE

CROSS REFERENCE TO RELATED APPLICATIONS

This application is a 35 U.S.C. § 371 national stage application of PCT International Application No. PCT/EP2020/074183 filed on Aug. 31, 2020, which in turn claims foreign priority to Indian Patent Application No. 201941035302, filed on Sep. 2, 2019, the disclosures and content of which are incorporated by reference herein in their entirety.

TECHNICAL FIELD

The invention relates to a clutch plate for use in a powertrain of a vehicle. It also relates to a clutch assembly and a vehicle comprising such a clutch plate or clutch assembly. The invention further relates to a method for detecting wear of a clutch plate in a powertrain of a vehicle, a computer program, a computer program product, and a control unit.

The invention can be applied in heavy-duty vehicles, such as trucks, buses and construction equipment. Although the invention will be described with respect to a truck, the invention is not restricted to this particular vehicle, but may also be used in other vehicles such as buses, trailers or passenger cars.

BACKGROUND

Clutches are used in powertrains of vehicles to transfer driving torque from the engine to a gearbox of the powertrain. The clutch generally includes one or more clutch plates connected for common rotation with a transmission shaft connected to the gearbox.

Friction members of the clutch plate are selectively engaged with a flywheel connected for common rotation with a crankshaft of the engine. Upon engagement of the clutch, the clutch plate and the flywheel, and thereby also the transmission shaft and the crankshaft, rotate together with a common rotational speed. When the clutch is disengaged, no torque is transferred between the crankshaft and the transmission shaft. Thus, during normal operation of the vehicle, the clutch is engaged so that driving torque may be transferred.

The friction members of the clutch plate are subjected to wear over time, reducing their thickness. To ensure proper operation of the clutch, it is necessary to replace the friction members when they have worn too thin. Various ways of determining when replacement of the friction members is necessary are used. For example, the clutch plate may be visually inspected at regular maintenance intervals. A mechanical clutch wear indicator may also be included in an actuating cylinder of the clutch, facilitating visual inspection of clutch wear during service of the vehicle. However, to be able to carry out such a visual inspection, it is generally required to enter under the vehicle.

DE4445577 discloses a method for monitoring clutch wear in which a displacement sensor is used to determine displacement of a detection device as the clutch plate wears out. The measured displacement is read into evaluation electronics and the clutch wear may thereby be determined without visual inspection under the vehicle.

SUMMARY

A primary object of the present invention is to provide a clutch plate and a clutch assembly for use in a powertrain of a vehicle, which clutch plate and clutch assembly in at least some aspect facilitate the detection of wear of the clutch plate. Another object is to provide an alternative or improved method by means of which wear of a clutch plate in a powertrain of a vehicle may be detected without having to visually inspect the clutch plate, or a mechanical wear indicator thereof, during service of the vehicle. Yet another object is to provide a vehicle in which clutch wear can be easily detected and monitored.

According to a first aspect of the invention, at least the primary object is achieved by a clutch plate for use in a powertrain of a vehicle according to claim 1. The clutch plate is configured to be connected for common rotation with a driven shaft of the powertrain extending in an axial direction, the clutch plate comprising a support member and at least one first friction member attached to the support member, the at least one first friction member having a first friction surface configured to face and selectively engage a corresponding second friction surface of a flywheel of the powertrain. The clutch plate further comprises at least one electrically conducting element extending from the first friction surface toward the support member in a direction having an axial component, the at least one electrically conducting element being configured to be electrically connected to a terminal, so that, upon engagement of the first and second friction surfaces, an electric signal may be passed between the flywheel and the terminal via the at least one electrically conducting element.

Since the at least one electrically conducting element extends from the first friction surface of the clutch plate, it has an end or a portion being level with the first friction surface. During normal operation of the vehicle, i.e. driving with a gear engaged, the first friction surface of the clutch plate is in contact the corresponding second friction surface of the flywheel. Thus, the at least one electrically conducting element is also in contact with the flywheel during normal operation of the vehicle. When the friction surface of the clutch plate is worn over time, the electrically conducting element is also being worn, causing a volume reduction of the electrically conducting element. Consequently, the electrical resistance of the electrically conducting element(s) is reduced. The electrical resistance of the electrically conducting element(s) thus correlates with the amount of wear of the first friction member of the clutch plate, and may thus be measured to get an indication of the amount of wear of the friction member of the clutch plate. Such a measurement may easily be carried out e.g. each time an engine of the powertrain is started, by passing a current between or by applying a voltage across the flywheel and the driven shaft. The measured resistance may be compared to a set resistance value, or a known "golden" resistance value, as determined for a non-worn clutch plate or electrically conducting element using the same set-up. Measurement values may be logged to monitor the wear of the clutch plate over time.

The clutch plate may further include a centrally positioned torsional damper. It may also include at least one second friction member, wherein the first and second friction members are positioned on opposite sides of the support member in the axial direction. The at least one second friction member is thereby configured to frictionally engage with a pressure plate for pressing the clutch plate toward the flywheel. Furthermore, a plurality of first friction members may be provided, arranged circumferentially around a central axis of the clutch plate.

The at least one electrically conducting element should preferably be configured to have well-known, i.e. pre-known and/or determinable, electrical properties to facilitate the correlation of the electrical resistance with the amount of wear of the friction member. It may e.g. have a uniform thickness and electrical conductivity along its length, its length being configured to decrease as the first friction member wears.

The electrically conducting element(s) may at least partly be embedded into the clutch plate.

According to an embodiment, the at least one electrically conducting element has a first end provided at the first friction surface and a second end configured to be electrically connected to the terminal. The at least one electrically conducting element may thereby be configured such that its length reduces as the first friction member wears, with an easily predictable reduction in electrical resistance. The electrical resistance of the electrically conducting element(s) is thereby easy to correlate to the amount of wear of the first friction member.

According to an embodiment, the support member and the second end of the at least one electrically conducting element are both located on the same side of the first friction member in the axial direction. In other words, the electrically conducting element extends through the entire friction member in the axial direction, although a direction of extension of the electrically conducting element does not necessarily need to be parallel to the axial direction. This is beneficial for ease of assembly and enables monitoring the wear of the first friction member until it is entirely worn out.

According to an embodiment, the second end of the at least one electrically conducting element is configured to contact the driven shaft when the clutch plate is mounted thereon, the driven shaft forming said terminal. In this embodiment, the driven shaft constitutes the terminal to which the at least one electrically conducting element is configured to be connected. For example, the driven shaft may form a positive terminal, while the flywheel may constitute a ground terminal, or vice versa. A galvanic contact is provided between the driven shaft and the electrically conducting element, and thereby well-defined current-voltage characteristics. If e.g. a torsional damper is provided radially inside of the first friction member(s), the electrically conducting element(s) may be configured to surpass the torsional damper or to extend through the torsional damper. The electrically conducting element(s) may need to be electrically insulated.

According to an embodiment, the at least one electrically conducting element comprises a first portion extending from the first end in an axial direction of the clutch plate, and a second portion extending from the first portion to the second end in a radial direction of the clutch plate. As the clutch plate is worn and its thickness is reduced, the length of the first portion of the at least one electrically conducting element will thus be reduced by the same amount as the thickness reduction of the first friction member, while the second portion is unaffected. The amount of wear can thereby easily be determined from the reduction in resistance of the at least one electrically conducting element.

The first portion may extend through the first friction member. The second portion may extend at an interface between the support member and the first friction member.

The first portion may be arranged at a radial position of the clutch plate at which a pressure exerted from a pressure plate is expected to be high, such that galvanic connection between the electrically conducting element(s) and the flywheel is ensured.

According to an embodiment, the at least one electrically conducting element is a conducting wire, preferably a metal wire. Several conducting wires may be provided. A conducting wire provides a cost efficient, well-defined and reliable electrically conducting element. It may be made of e.g. copper, or aluminium, or lead, or alloys thereof, or other conducting metal material.

According to an embodiment, the at least one electrically conducting element comprises a conducting core element and an insulating layer configured to electrically isolate the conducting core element. The at least one electrically conducting element may in this embodiment be an insulated conducting wire. The insulating layer protects the conducting core from contact with e.g. the support member, which may be metallic. The insulating layer may extend along the entire electrically conducting element, or only along parts of the electrically conducting element(s) that would otherwise be in contact with e.g. the support member and/or a torsional damper of the clutch plate.

According to an embodiment, a radial distance between a first end of the at least one electrically conducting element provided at the first friction surface and a central axis of the clutch plate is at least $0.5*r$, preferably at least $0.6*r$, more preferably at least $0.7*r$, most preferably at least $0.8*r$, wherein r is a radius of the clutch plate. This is beneficial in particular since a pressure plate pressing the clutch plate against the flywheel usually applies the highest pressure close to a circumference of the clutch plate. Thus, it is ensured that a high pressure is applied at the location of the first end(s) of the electrically conducting element(s), ensuring galvanic contact between the flywheel and the electrically conducting element(s) during normal operation of the vehicle.

According to an embodiment, said at least one electrically conducting element comprises a plurality of electrically conducting elements, wherein first ends of the electrically conducting elements provided at the first friction surface are spaced apart in a circumferential direction of the clutch plate. An average value of the clutch plate wear may thereby be determined. The second ends may be evenly or unevenly spaced. Furthermore, by providing several electrically conducting elements, the robustness of the clutch plate wear monitoring process may be improved, since the monitoring may be continued even if one of the electrically conducting elements is damaged or loses contact with the driven shaft.

According to a second aspect of the invention, at least one of the above defined objects is achieved by a clutch assembly for a powertrain of a vehicle, comprising:
  a clutch plate according to any one of the preceding claims,
  a flywheel configured to be connected for common rotation with a crankshaft of the powertrain, the flywheel comprising a second friction surface,
  means for selectively pressing the clutch plate toward the flywheel such that the first and second friction surfaces are frictionally engaged and such that the at least one electrically conducting element comes into contact with the second friction surface of the flywheel,
  clutch wear detection means configured for determining an electrical resistance of the at least one electrically conducting element as it is in contact with the flywheel, and based thereon determining a thickness value of and/or an amount of wear of the first friction member.

The means for selectively pressing the clutch plate toward the flywheel may e.g. be a pressure plate, a release bearing and a diaphragm spring member. Also other means may be used, including e.g. one or more coil springs.

The second friction surface of the flywheel should be a conductive surface, or a surface comprising at least one conductive surface region configured to come into contact with the at least one electrically conductive element upon frictional engagement of the first and second friction surfaces. Preferably, it may be a metallic surface.

The clutch wear detection means may be configured for determining an electrical resistance of the at least one electrically conducting element by sending an electric signal between the flywheel and the driven shaft via the at least one electrically conducting element. Thus, the clutch wear detection means may comprise means for sending an electric signal between the flywheel and the driven shaft via the at least one electrically conducting element. For this purpose, the clutch wear detection means may comprise a terminal for electrical connection to the at least one electrically conducting element, either directly or via an intermediate component. For example, the driven shaft may be used as a terminal or as an intermediate component. The driven shaft should in this case be made of conductive material, such as metal, or at least partly be made of conductive material.

The driven shaft may be a transmission shaft, transferring torque to a gearbox of the powertrain. Such a shaft may also be referred to as an input shaft of the gearbox.

The determined electrical resistance may be compared to an original resistance of the electrically conducting element, as determined prior to wear using the same set-up, and the wear of the clutch plate may thereby be determined. A look-up table comprising values of resistance and corresponding amount of wear may be used. The resistance may be determined using a constant current or a constant voltage technique.

According to an embodiment, the clutch wear detection means comprises an electronic control unit. Monitoring of the clutch wear may thereby be carried out automatically. The electronic control unit may be configured to compare a set original resistance of the electrically conducting element with repeatedly measured values to determine the clutch wear.

According to an embodiment, the clutch assembly further comprises communication means for communicating information relating to the thickness value and/or the amount of wear to a driver of the vehicle. The communication means may be provided in the form of a Controller Area Network (CAN) bus for communicating data, and a display, a monitor, a speaker or similar, for communicating the determined amount of clutch wear to the driver of the vehicle.

Advantages and effects provided by the clutch assembly are largely analogous to the advantages and effects provided by the first aspect of the invention. It shall also be noted that each embodiment of the first aspect of the invention is applicable with each embodiment of the second aspect of the invention and vice versa.

According to a third aspect of the invention, at least one of the above defined objects is achieved by a vehicle comprising a clutch plate according to the first aspect and/or a clutch assembly according to the second aspect. The vehicle may e.g. be a heavy-duty vehicle such as a truck or a bus. Advantages and effects provided by the vehicle are largely analogous to the advantages and effects provided by the other aspects of the invention. It shall also be noted that each embodiment of the third aspect of the invention is applicable with each embodiment of the first and second aspects of the invention.

According to a fourth aspect of the invention, at least one of the above defined objects is achieved by a method for detecting wear of a clutch plate in a powertrain of a vehicle, the clutch plate being connected for common rotation with a driven shaft of the powertrain extending in an axial direction, the clutch plate comprising a support member and at least one first friction member attached to the support member, the first friction member having a first friction surface configured to face and selectively engage a corresponding second friction surface of a flywheel of the powertrain, the clutch plate further comprising at least one electrically conducting element extending from the first friction surface toward the support member in a direction having an axial component, the at least one electrically conducting element being electrically connected to a terminal, the method comprising:

sending an electric signal between the terminal and the flywheel via the at least one electrically conducting element, and based thereon determining an electrical resistance of the at least one electrically conducting element, based on the determined electrical resistance, determining a thickness value of and/or an amount of wear of the first friction member.

Thus, an electric signal is passed through the at least one electrically conducting element as the clutch plate is in engagement with the flywheel, the at least one electrically conducting element thus being in contact with the second friction surface. The method may e.g. be performed each time the engine is started. The measured value may be stored in order to monitor wear over time.

According to an embodiment, the method further comprises communicating data relating to the determined thickness value and/or the amount of wear to a driver of the vehicle.

Advantages and effects provided by the method are largely analogous to the advantages and effects provided by the other aspects of the invention. It shall also be noted that each embodiment of the fourth aspect of the invention is applicable with each embodiment of the other aspects of the invention.

According to a fifth aspect of the invention, at least one of the above defined objects is achieved by a computer program comprising program code means for performing the steps of the method according to the fourth aspect when said computer program is run on a computer.

According to a sixth aspect of the invention, at least one of the above defined objects is achieved by a computer readable medium carrying a computer program comprising program code means for performing the steps of the method according to the fourth aspect when said computer program is run on a computer.

According to a seventh aspect of the invention, at least one of the above defined objects is achieved by control unit for detecting wear of a clutch plate in a powertrain of a vehicle, the control unit being configured to perform the steps of the method according to the fourth aspect.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

The drawings show diagrammatic exemplifying embodiments of the present invention and are thus not necessarily drawn to scale. It shall be understood that the embodiments shown and described are exemplifying and that the invention is not limited to these embodiments. It shall also be noted that some details in the drawings may be exaggerated in order to better describe and illustrate the invention. Like reference characters refer to like elements throughout the description, unless expressed otherwise.

DETAILED DESCRIPTION OF EXAMPLE EMBODIMENTS OF THE INVENTION

Figure 1:
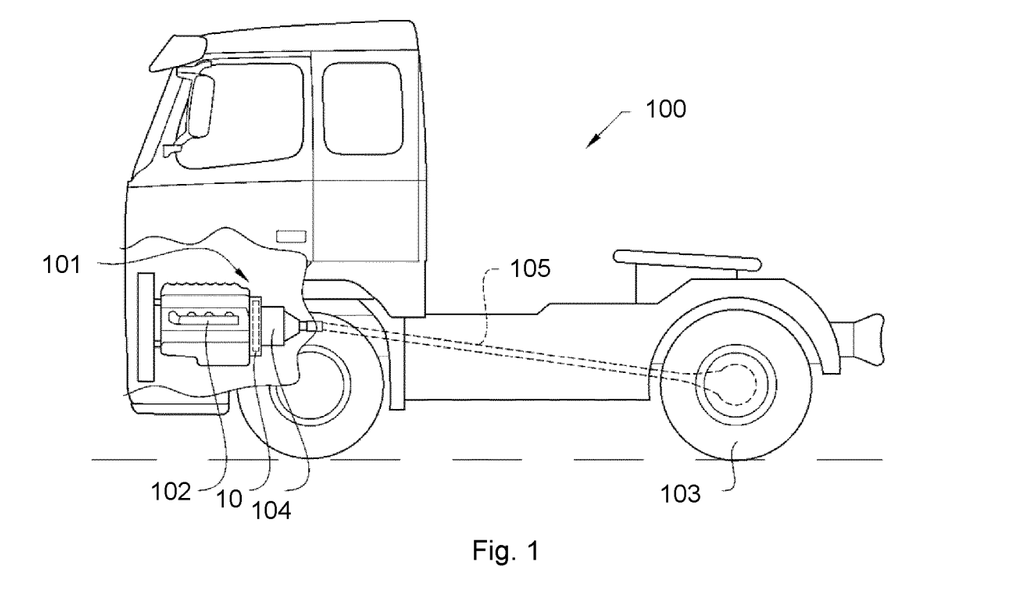
FIG. 1 schematically shows a vehicle according to an embodiment of the invention.

A vehicle 100 in the form of a truck according to an embodiment of the invention is schematically shown in FIG. 1. The vehicle 100 includes a powertrain 101 with an engine 102 connected to a clutch assembly 10. The clutch assembly 10 selectively connects a crankshaft of the engine 102 to an input shaft of a transmission 104, and thereby transfers torque from the engine to the transmission 104. A drive shaft 105 connects the transmission 104 to driving wheels 103 of the vehicle 100.

Figure 2:
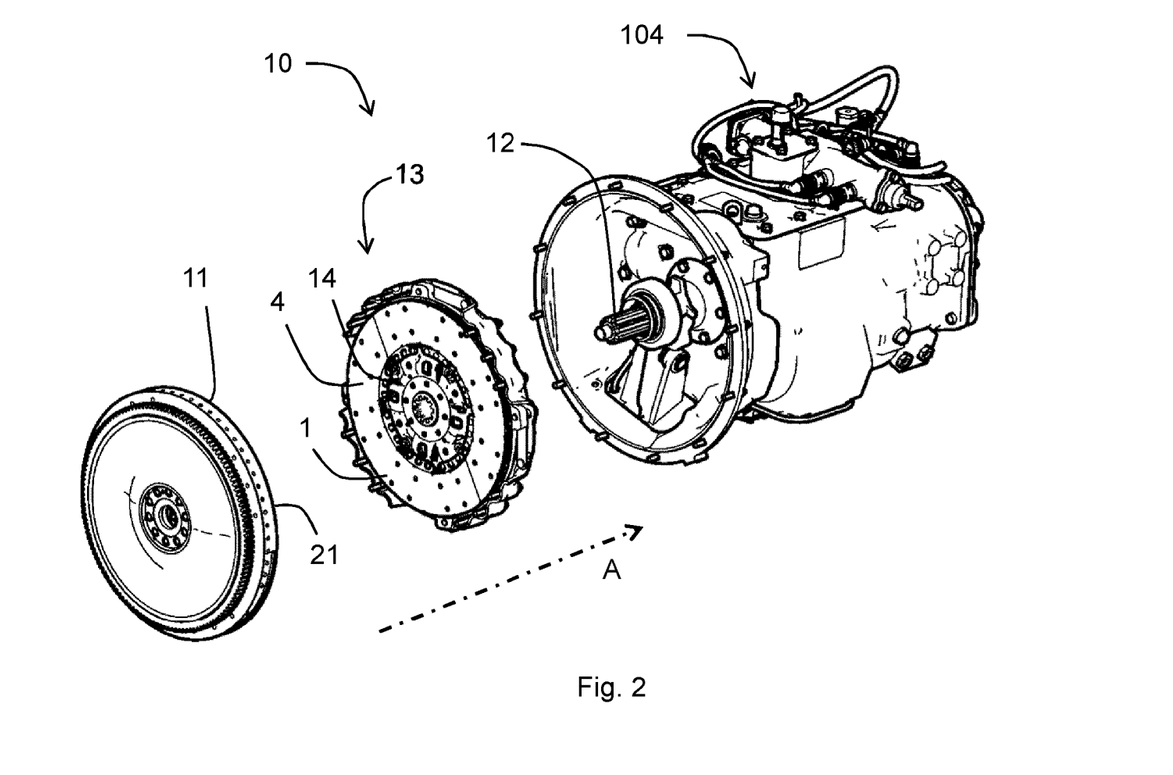
FIG. 2 is an exploded perspective view showing a clutch assembly according to an embodiment of the invention.
Figure 3:
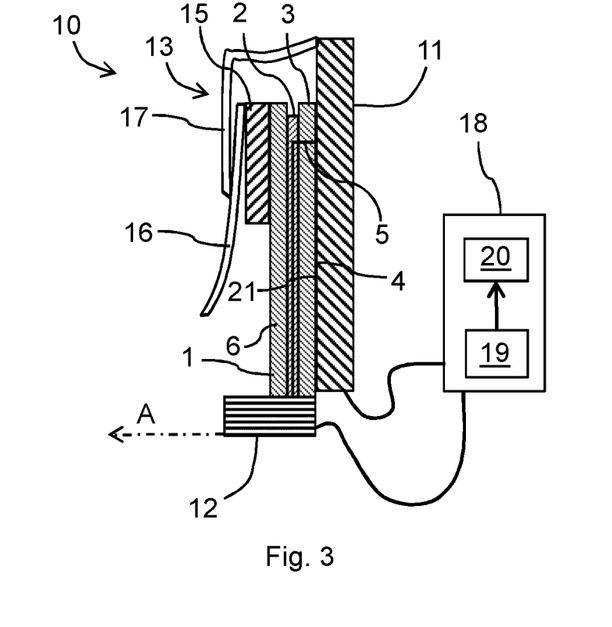
FIG. 3 is a schematic sectional view of a clutch assembly according to an embodiment of the invention.

FIG. 2 shows the transmission 104 and parts of the clutch assembly 10 in greater detail and FIG. 3 shows a simplified sectional view of the clutch assembly 10 according to an embodiment. The clutch assembly 10 includes a flywheel 11 configured to be connected for common rotation with the crankshaft (not shown) and a clutch 13. A driven shaft 12 in the form of a transmission shaft extends in an axial direction A from the flywheel toward the transmission 104. The clutch 13 includes a clutch plate 1 having a first friction surface 4 configured for frictional engagement with a corresponding second friction surface 21 of the flywheel 11, and means for selectively pressing the clutch plate 1 toward the flywheel 11, such as a pressure plate 15, a diaphragm spring 16 and a release bearing (not shown). A clutch cover 17 may further be provided.

The clutch plate 1 includes a support member 2 in the form of a thin metal plate, a first friction member 3 attached to the support member 2 on the side facing the flywheel 11, and a second friction member 6 attached to the support member 2 on the side facing the pressure plate 15. The first friction member 3 includes the first friction surface 4, facing the corresponding second friction surface 21 of the flywheel 11.

Figure 4:
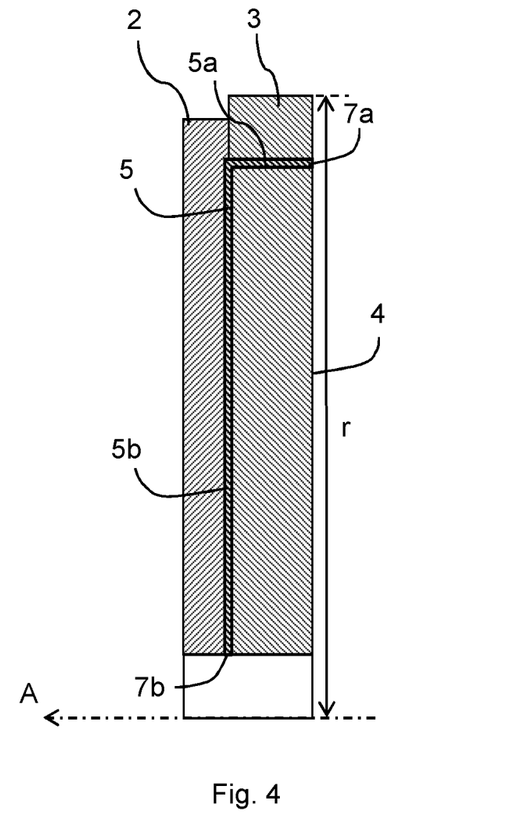
FIG. 4 is a schematic sectional view of portions of a clutch plate according to an embodiment of the invention.

The clutch plate 1 further comprises at least one electrically conducting element 5 in the form of a conducting wire 5 configured to be electrically connected to the driven shaft 12, the driven shaft 12 herein forming a terminal 12. As schematically shown in FIG. 4, the conducting wire 5 extends from a first end 7a located at the first friction surface 4 to a second end 7b configured to be electrically connected to the driven shaft 12 by means of a galvanic contact. The conducting wire 5 comprises a first portion 5a extending from the first end 7a and through the friction member 3 toward the support member 2 in the axial direction A. The conducting wire 5 further comprises a second portion 5b extending from the first portion 5a to the second end 7b in a radial direction of the clutch plate 1. The second portion 5b herein extends at an interface between the support member 2 and the friction member 3. The conducting wire 5 is, at least along the second portion 5b, an insulated conducting wire, which may be embedded into the clutch plate 1.

A clutch wear detection means 18 is electrically connected to the flywheel 11 on one hand and to the second end 7b of the electrically conducting element 5 on the other hand, in this embodiment via the driven shaft 12. The clutch wear detection means 18 is configured for determining an electrical resistance of the at least one electrically conducting element 5 as it is in contact with the flywheel 11, and based thereon determining a thickness value of and/or an amount of wear of the first friction member 3 of the clutch plate 1. The clutch wear detection means 18 may e.g. comprise an electronic control unit 19 and a communication means for communicating information relating to the thickness value and/or the amount of wear to a driver of the vehicle 100, such as a display 20 or similar. A CAN bus or similar may be used to communicate data between the electronic control unit 19 and the display 20.

During operation of the vehicle 100, when driving with the clutch 13 engaged, the first friction surface 4 of the clutch plate 1 and the second friction surface 21 of the flywheel 11 are in frictional engagement. Thereby, the first end 7a of the conducting wire 5 is in contact with the flywheel 11, while the second end 7b is in contact with the driven shaft 12. A closed electric circuit is formed comprising the flywheel 11, the electrically conducting element 5, the driven shaft 12, and the clutch wear detection means 18. An electric signal may be sent by the clutch wear detection means 18 between the flywheel 11, forming a ground terminal, and the driven shaft 12, forming a positive terminal. The electrical resistance of the conducting wire 5 may thereby be determined.

A radial distance between the first end 7a of the at least one electrically conducting element 5 and a central axis of the clutch plate should preferably be at least 0.5*r, preferably at least 0.6*r, more preferably at least 0.7*r, most preferably at least 0.8*r, wherein r is a radius of the clutch plate 1, as shown in FIG. 4.

The clutch plate 1 as shown in FIG. 2 also includes a centrally positioned torsional damper 14 (omitted in FIGS. 3-4). The electrically conducting element(s) 5 may be in the form of one or more insulated conducting wires such that electric contact between the torsional damper 14 and the electrically conducting element(s) 5 is prevented.

A method for detecting wear of the clutch plate 1 when mounted in the powertrain 101 as described above is illustrated in the flow chart of FIG. 5.

Figure 5:
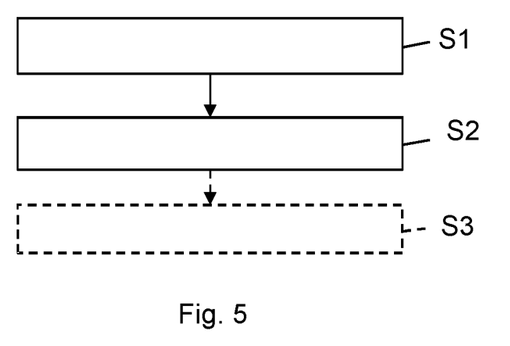
FIG. 5 is a flow chart illustrating a method according to an embodiment of the invention.

In a first step S1, an electric signal is sent between the terminal and the flywheel 11 via the at least one electrically conducting element 5, and based thereon an electrical resistance of the at least one electrically conducting element 5 is determined. For example, the electrical resistance may be determined from the measured current for a known applied voltage across the flywheel 11 and the driven shaft 12, or from the measured voltage for a known current pulse between the flywheel 11 and the driven shaft 12.

In a second step S2, based on the determined electrical resistance, a thickness value of and/or an amount of wear of the first friction member 3 is determined. The thickness of the first friction member 3 equals the length of the first portion 5a of the conducting wire 5, which (for a wire of uniform thickness) is proportional to the resistance of the conducting wire. Thus, by measuring the electrical resistance of the conducting wire 5, its length and thereby the thickness and/or the amount of wear of the friction member 3 may be determined by comparing the measured resistance to an original resistance of the conductive wire 5, as determined prior to wear, and the wear of the friction member 3 may thereby be determined. A look-up table comprising values of resistance and corresponding amount of wear may be used. The electronic control unit 19 may be used for this purpose.

The method may also comprise an optional third step S3, in which data relating to the determined thickness and/or the amount of wear is communicated to a driver of the vehicle. The data may also be stored for use during e.g. service of the vehicle.

The method may e.g. be performed each time the engine 102 is started, or each time a predetermined condition is fulfilled, such as each time the engine is started and at least a predetermined time interval has elapsed since the preceding occasion that the method was performed, and/or each time the engine is started and the engine temperature is within a predefined temperature range.

Figure 6:
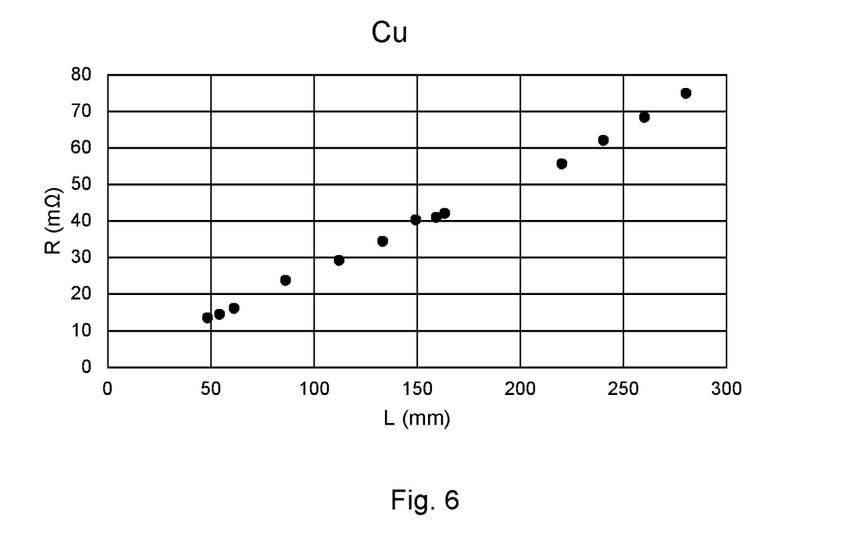
FIG. 6 is a diagram showing resistance R of a Cu wire as a function of length L.
Figure 7:
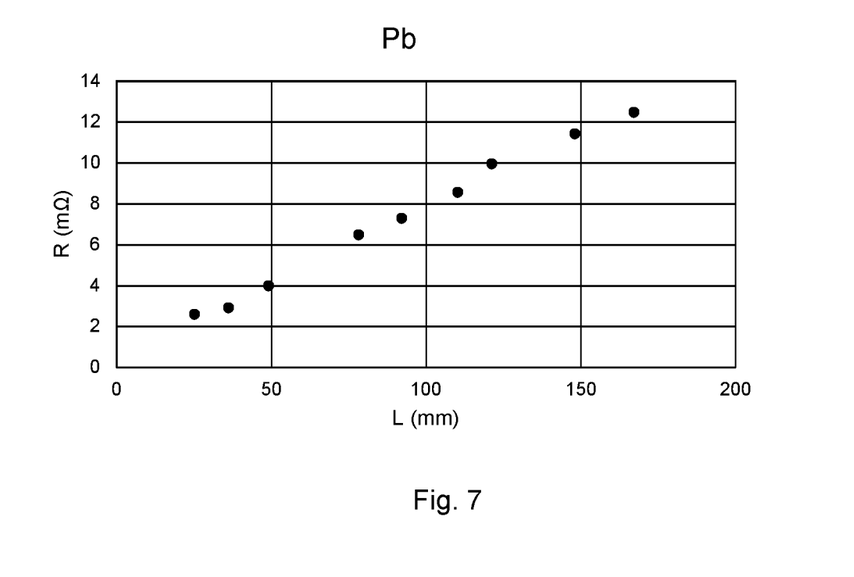
FIG. 7 is a diagram showing resistance R of a Pb wire as a function of length L.

Measured resistance values R in mΩ as a function of length L in mm of a Cu wire and a Pb wire, respectively, are plotted in FIGS. 6-7. The cross sectional area of the wires was homogeneous. As seen from the charts, there is a notable reduction in resistance also for slight changes in length, which indicates that the method according to embodiments of the invention may be used to reliably determine an amount of wear of a friction member 3 of a clutch plate 1.

The control functionality of the example embodiments may be implemented using existing computer processors, or by a special purpose computer processor for an appropriate system, incorporated for this or another purpose, or by a hardwire system. Embodiments within the scope of the present disclosure include program products comprising machine-readable medium for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

It is to be understood that the present invention is not limited to the embodiments described above and illustrated in the drawings; rather, the skilled person will recognize that many changes and modifications may be made within the scope of the appended claims.

The invention claimed is:

1. A clutch assembly for a powertrain of a vehicle, comprising:
   a flywheel configured to be connected for common rotation with a crankshaft of the powertrain,
   a clutch plate configured to be connected for common rotation with a driven shaft of the powertrain extending in an axial direction, the clutch plate comprising a support member and at least one first friction member attached to the support member, the at least one first friction member having a first friction surface configured to face and selectively engage a corresponding second friction surface of the flywheel,
   wherein the clutch plate further comprises at least one electrically conducting element extending from the first friction surface toward the support member in a direction having an axial component, the at least one electrically conducting element being configured to be electrically connected to a terminal, so that, upon engagement of the first and second friction surfaces, an electric signal may be passed between the flywheel and the terminal via the at least one electrically conducting element, wherein the at least one electrically conducting element has a first end provided at the first friction surface and a second end configured to be electrically connected to the terminal, and
   means for selectively pressing the clutch plate toward the flywheel such that the first and second friction surfaces are frictionally engaged and such that the at least one electrically conducting element comes into contact with the second friction surface of the flywheel,
   wherein:
   the second friction surface comprises at least one conductive surface region configured to come into contact with the at least one electrically conducting element upon frictional engagement of the first and second friction surfaces,
   the second end of the at least one electrically conducting element is configured to contact the driven shaft when the clutch plate is mounted thereon, the driven shaft forming said terminal, and
   the clutch assembly further comprises clutch wear detection means configured for determining an electrical resistance of the at least one electrically conducting element as it is in contact with the flywheel, and based thereon determining a thickness value of and/or an amount of wear of the first friction member.

2. The clutch assembly according to claim 1, wherein the support member and the second end of the at least one electrically conducting element are both located on the same side of the first friction member in the axial direction.

3. The clutch assembly according to claim 1, wherein the at least one electrically conducting element comprises a first portion extending from the first end in an axial direction of the clutch plate, and a second portion extending from the first portion to the second end in a radial direction of the clutch plate.

4. The clutch assembly according to claim 1, wherein the at least one electrically conducting element is a conducting wire.

5. The clutch assembly according to claim 4, wherein the conducting wire comprises a metal wire.

6. The clutch assembly according to claim 1, wherein the at least one electrically conducting element comprises a conducting core element and an insulating layer configured to electrically isolate the conducting core element.

7. The clutch assembly according to claim 1, wherein a radial distance between a first end of the at least one electrically conducting element provided at the first friction surface and a central axis of the clutch plate is at least 0.5*r, wherein r is a radius of the clutch plate.

8. The clutch assembly according to claim 1, wherein said at least one electrically conducting element comprises a plurality of electrically conducting elements, wherein first ends of the electrically conducting elements provided at the first friction surface are spaced apart in a circumferential direction of the clutch plate.

9. A vehicle comprising a clutch assembly according to claim 1.

10. A method for detecting wear of a clutch plate in a powertrain of a vehicle, the clutch plate being connected for common rotation with a driven shaft of the powertrain extending in an axial direction, the clutch plate comprising a support member and at least one first friction member attached to the support member, the first friction member having a first friction surface configured to face and selectively engage a corresponding second friction surface of a flywheel of the powertrain, the clutch plate further comprising at least one electrically conducting element extending from the first friction surface toward the support member in a direction having an axial component, the at least one electrically conducting element being electrically connected to a terminal, the at least one electrically conducting element having a first end provided at the first friction surface and a second end configured to be electrically connected to the terminal, the second friction surface comprising at least one conductive surface region configured to come into contact with the at least one electrically conducting element upon frictional engagement of the first and second friction surfaces, the second end of the at least one electrically conducting element being configured to contact the driven shaft when the clutch plate is mounted thereon, the driven shaft forming said terminal, the method comprising:
sending an electric signal between the terminal and the flywheel via the at least one electrically conducting element, and based thereon determining an electrical resistance of the at least one electrically conducting element, and based on the determined electrical resistance, determining a thickness value of and/or an amount of wear of the first friction member.

11. A non-transitory computer readable medium containing a computer program comprising program code for performing the method according to claim 10 when said computer program is run on a computer.

12. A control unit for detecting wear of a clutch plate in a powertrain of a vehicle, the control unit being configured to perform the steps of the method according to claim 10.

13. The clutch assembly according to claim 1, wherein a radial distance between a first end of the at least one electrically conducting element provided at the first friction surface and a central axis of the clutch plate is at least 0.6*r, wherein r is a radius of the clutch plate.

14. The clutch assembly according to claim 1, wherein a radial distance between a first end of the at least one electrically conducting element provided at the first friction surface and a central axis of the clutch plate is at least 0.7*r, wherein r is a radius of the clutch plate.

15. The clutch assembly according to claim 1, wherein a radial distance between a first end of the at least one electrically conducting element provided at the first friction surface and a central axis of the clutch plate is at least 0.8*r, wherein r is a radius of the clutch plate.

* * * * *